May 24, 1960 G. CAILLETTE 2,937,496
JET PROPELLING UNIT
Filed Jan. 16, 1956
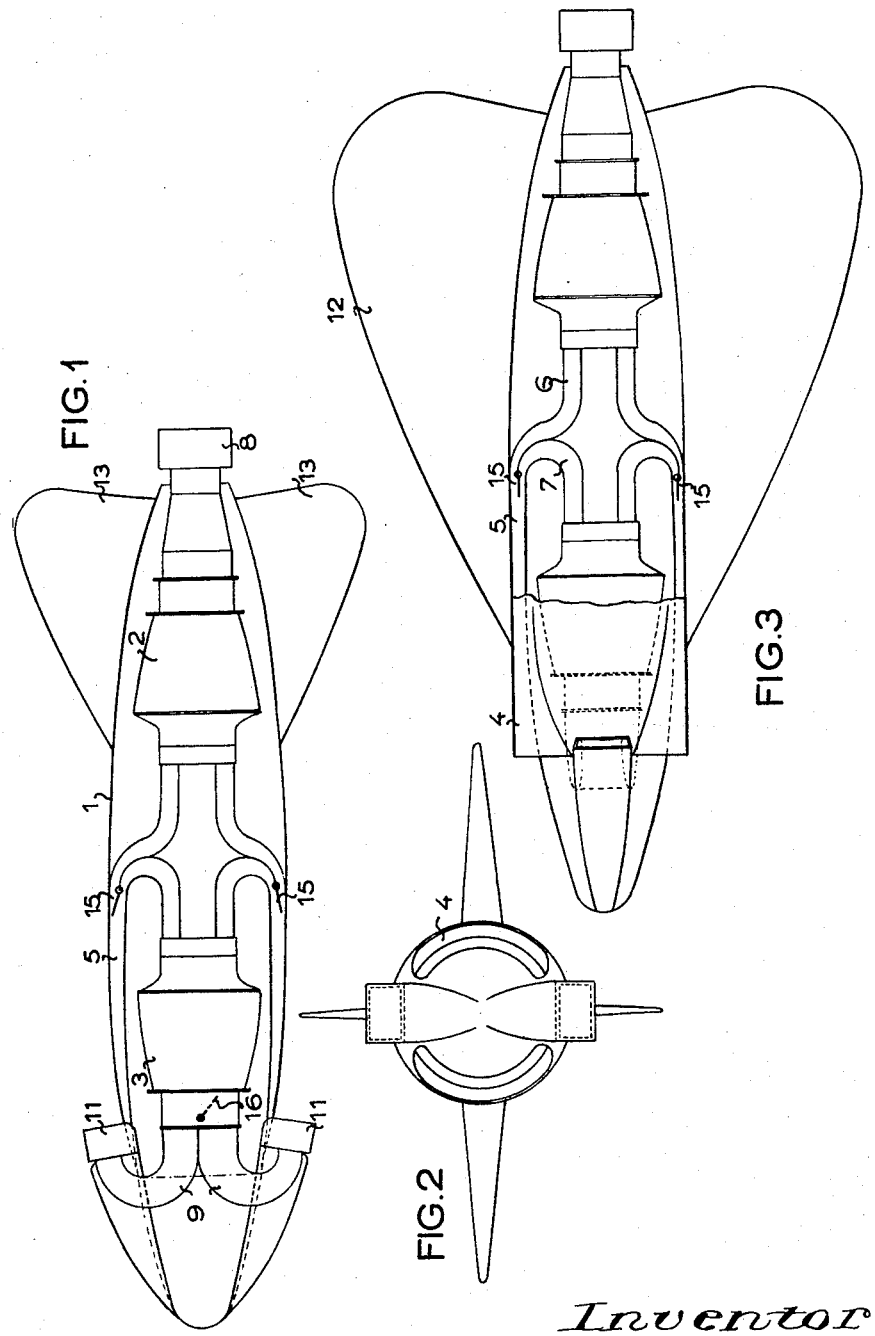
Inventor
G. Caillette

United States Patent Office 2,937,496
Patented May 24, 1960

2,937,496
JET PROPELLING UNIT

Georges Caillette, 18 bis rue de l'Eglise, Neuilly-sur-Seine, France

Filed Jan. 16, 1956, Ser. No. 559,311

Claims priority, application France Jan. 25, 1955

3 Claims. (Cl. 60—35.54)

The present invention relates to pet propulsion power plants including two turbo-jet power units associated for propelling a flying body, more particularly an aircraft.

The object of the invention is to provide an assembly of two turbo-jet power units, which has the advantage of delivering coaxial thrusts, while possessing a relatively simple common device for feeding said two units with comburant air.

Said result is obtained, according to the invention, by alining the engines coaxially, but in opposite directions, so that their air inlets face each other, and providing the front unit, as considered in the direction of progression of the propelled craft with a plurality of reaction nozzles bent rearwardly and symmetrically arranged with respect to the common axis of the units.

In one embodiment, both units are fed with comburant air by a device which comprises common elements leading to the space provided between the two units.

In a preferred structure, means are provided for varying the direction of the gas streams discharged from the outlet nozzles of the front unit and/or the rear unit in order to enhance or permit the evolutions of the aircraft on which the jet propulsion power plant is mounted.

Further according to the invention there is provided a jet propulsion power plant as set forth above in combination with an aircraft such, for example, as is in U.S.A. on July 23, 1952, Ser. No. 300,463, by applicant the reaction nozzles of the front unit being provided with means for orientating the reaction jets discharged therefrom and ensuring the suitable positioning of the point of application of the resultant thrust force of the unit, namely, ahead of the center of gravity of the aircraft.

Furthermore, the jet propulsion power plant may be conveniently embodied in a tailless aircraft of a very low aspect ratio (between 1.2 and 1.35) such as described in U.S. Patent 2,511,502 to Gluhareff.

Other objects and advantages of the invention will be apparent to those skilled in the art, from a consideration of the following description of one specific embodiment of the invention, shown by way of example, in the accompanying drawings in which:

Fig. 1 is a diagrammatical longitudinal vertical section of a propelling jet propulsion power plant according to the invention mounted in an aircraft.

Fig. 2 is a corresponding front view, and

Fig. 3 is a plan view corresponding to Fig. 1 with some portions cut away.

Referring to the drawings, 1 is an aircraft comprising a low aspect ratio wing and a propulsion power plant constituted by two turbo-jet engines 2 and 3 arranged along the axis of the aircraft, one in the rear, the other in the front, and in opposite directions, in such a manner that their air inlets are facing each other.

The air enters through two lateral ports 4 leading to passages 5 which are bifurcated at the point where they reach the space located between the two engines, so as to form passages 6 directed rearwardly for feeding the engine 2 and passages 7 bent forwardly for feeding the engine 3.

The outlet nozzle 8 of the rear engine 2 is oriented rearwardly, whereas the outlet nozzles 9 (two in number, in the example illustrated) of the front engine 3 are first oriented forwardly and then are bent so that their outlets 11 also are oriented toward the rear of the aircraft.

Both outlets 11 from the engine 3 are positioned in the vertical plane of symmetry of the aircraft which has a wing 12 and two tail fins 13.

In order to enable the aircraft to fly in any desired direction, the outlets from the nozzles of the front engine 3 and, if need be, also the outlet from the rear engine 2, are provided with means adapted to deviate the streams of gases flowing out therefrom. For this purpose, this orientation of the jets may be controlled as indicated, in particular, in the aforementioned patent application filed in U.S.A. on July 23, 1952, Ser. No. 300,463, by applicant.

Fig. 3 diagrammatically shows a device, in the form of air inlet flap valves 15, arranged at the points where the passages 5 are bifurcated in order to feed separately both engines. By varying the angular position of these flap valves it is possible to vary the distribution of the air supplied to the respective engines and, if need be, to direct selectively to either one of the engines the totality of the air fed to the inlet ports 4.

Furthermore, provision may be made for a device diagrammatically shown in Fig. 1 by a flap valve 16 and which makes it possible to distribute at will the amount of gases discharged by the front engine into the nozzles 9. In the example illustrated by varying the angular position of the flap valve 16 it becomes possible to distribute the gases discharged by the engine 3 in any desired proportion between respective nozzles 9. It is further possible to direct the total flow through either of said nozzles while no gases pass through the other nozzle.

It will be seen that the arrangement according to the invention permits mounting within a small space of two engines with coaxial thrusts and a common air feed system of simple design.

As many changes could be made in the above construction and many widely different embodiments of this invention could be made without departing from the scope of the claims, it is intended that all matter contained in the above description or shown in the accompanying drawings shall be interpreted as illustrative and not in a limiting sense.

Thus, in the embodiment illustrated, the front jet engine has two gas outlet nozzles, but any other suitable number of nozzles might be adopted, if need be.

Furthermore, it has been assumed that the aircraft represented has a single jet propelling unit of the type described and arranged along the axis of the craft, but the invention is also applicable to aircrafts comprising one or more units of this kind associated, if need be, with one or more engines or groups of engines of other types.

What is claimed is:

1. In a flying body, more particularly an aircraft, a jet propulsion power plant including in combination two, fore-and-aft extending, turbo-jet power units, coaxially aligned with their inlet ends facing each other, an air intake passage connected with an intake port positioned on said body to receive a continuous stream of air from the atmosphere, a first duct interconnecting said passage with the rearward end of the front unit, a second duct interconnecting said passage and the forward end of the rear unit, whereby the front unit receives air from the atmosphere at its rearward end and the rear unit receives air from the atmosphere at its forward end, a rearwardly extending exhaust duct in said rear unit terminating in a rearwardly directed reaction nozzle, a forwardly extending exhaust duct in said front unit terminating in outwardly and rearwardly bent reaction nozzles symmetrically arranged with respect to the fore-and-aft axis of the aircraft, and means to vary the volumetric flow and pressure of the exhaust gases of said front unit conducted to each of said rearwardly bent nozzles.

2. An aircraft according to claim 1, in which means are provided for controlling the flow of air from said intake passage to said first and second ducts respectively.

3. An aircraft according to claim 1, in which means are provided for varying the direction of the reaction jets discharged through said rearwardly bent nozzles of the front unit in such a manner that the resultant force of said jets may be oriented so as to either coincide with said fore-and-aft axis of the aircraft passing through the center of gravity thereof, or to intersect said axis at a point located ahead of said center of gravity.

References Cited in the file of this patent
UNITED STATES PATENTS

| | | |
|---|---|---|
| 1,690,043 | Wallis | Oct. 30, 1928 |
| 2,280,835 | Lysholm | Apr. 28, 1942 |
| 2,404,954 | Godsey | July 30, 1946 |
| 2,435,836 | Johnson | Feb. 10, 1948 |
| 2,598,544 | Holman et al. | May 27, 1952 |
| 2,683,415 | Wilson | July 13, 1954 |
| 2,753,685 | Mattinson | July 10, 1956 |

FOREIGN PATENTS

| | | |
|---|---|---|
| 157,781 | Great Britain | Apr. 10, 1922 |
| 461,887 | Great Britain | Feb. 25, 1937 |